L

(12) United States Patent
Yu et al.

(10) Patent No.: US 12,322,065 B2
(45) Date of Patent: Jun. 3, 2025

(54) APPARATUS AND METHOD FOR IMAGE OUTPAINTING BASED ON LEARNING OF A SINGLE INPUT IMAGE

(71) Applicant: ELECTRONICS AND TELECOMMUNICATIONS RESEARCH INSTITUTE, Daejeon (KR)

(72) Inventors: Jung-Jae Yu, Daejeon (KR); Ju-Won Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 408 days.

(21) Appl. No.: 17/990,880

(22) Filed: Nov. 21, 2022

(65) Prior Publication Data
US 2023/0169628 A1    Jun. 1, 2023

(30) Foreign Application Priority Data
Nov. 30, 2021    (KR) .................. 10-2021-0167895

(51) Int. Cl.
*G06T 5/00*    (2024.01)
*G06N 3/045*    (2023.01)
*G06T 5/50*    (2006.01)

(52) U.S. Cl.
CPC .............. *G06T 5/00* (2013.01); *G06N 3/045* (2023.01); *G06T 5/50* (2013.01); *G06T 2207/20084* (2013.01); *G06T 2207/20224* (2013.01)

(58) Field of Classification Search
CPC ... G06T 5/00; G06T 5/50; G06T 2207/20084; G06T 2207/20224; G06T 5/77;

(Continued)

(56) References Cited

U.S. PATENT DOCUMENTS

2014/0044167 A1    2/2014    Jung et al.
2018/0012333 A1    1/2018    Urban et al.
2022/0180490 A1    6/2022    Jo et al.

FOREIGN PATENT DOCUMENTS

KR    10-1554421 B1    9/2015
KR    10-2021-0082691 A    7/2021

(Continued)

OTHER PUBLICATIONS

Sabini, Mark, and Gili Rusak. "Painting outside the box: Image outpainting with gans." arXiv preprint arXiv:1808.08483 (2018). (Year: 2018).*

(Continued)

*Primary Examiner* — Molly Wilburn
*Assistant Examiner* — Emma N. Luke
(74) *Attorney, Agent, or Firm* — NSIP Law (57) ABSTRACT

Disclosed herein are an apparatus and method for image outpainting based on learning of a single input image. The apparatus generates multiple extended images from an input image using multiple noise vectors, inputs a first extended image, among the multiple extended images, the input image, and an image acquired by horizontally flipping the input image and thereby trains a discriminator network such that the loss of a generative adversarial network is minimized, and learns the multiple extended images such that the sum of two differences is minimized, the first one being the difference between the input image and the center region of a second extended image, and the second one being the difference between images acquired by vertically segmenting the input image and flipping the segments and the left and right regions of a third extended image.

8 Claims, 5 Drawing Sheets

(58) Field of Classification Search
CPC ....... G06T 2200/24; G06T 5/60; G06T 11/60; G06N 3/045; G06N 3/047; G06N 3/08; G06N 3/088; H04N 21/854; H04N 5/2628; H04N 5/265; H04N 21/8153; H04N 21/816
See application file for complete search history.

(56) References Cited

FOREIGN PATENT DOCUMENTS

| | | |
|---|---|---|
| KR | 10-2271521 B1 | 7/2021 |
| WO | WO 2020/180134 A1 | 9/2020 |

OTHER PUBLICATIONS

Kim, Kyunghun, et al. "Painting outside as inside: Edge guided image outpainting via bidirectional rearrangement with progressive step learning." Proceedings of the IEEE/CVF winter conference on applications of computer vision. 2021. (Year: 2021).*

Akimoto, Naofumi, Daiki Ito, and Yoshimitsu Aoki. "Scenery image extension via inpainting with a mirrored input." IEEE Access 9 (2021): 59286-59300. (Year: 2021).*

Shaham, Tamar Rott, et al. "Singan: Learning a generative model from a single natural image." *Proceedings of the IEEE/CVF International Conference on Computer Vision.* (2019). pp 1-11.

Van Hoorick, Basile. "Image outpainting and harmonization using generative adversarial networks." *arXiv preprint arXiv:1912.10960* vol. 2 (2019). pp 1-8.

\* cited by examiner

APPARATUS AND METHOD FOR IMAGE OUTPAINTING BASED ON LEARNING OF A SINGLE INPUT IMAGE

CROSS REFERENCE TO RELATED APPLICATION

This application claims the benefit of Korean Patent Application No. 10-2021-0167895, filed Nov. 30, 2021, which is hereby incorporated by reference in its entirety into this application.

BACKGROUND OF THE INVENTION

1. Technical Field

The present invention relates generally to technology for image outpainting, and more particularly to technology for learning and inferring images based on image outpainting.

2. Description of the Related Art

In the field of image outpainting, which is for generating an outer region of an input image by predicting the same, existing technologies are configured to learn a large amount of image data in advance and generate an outer region of a given input image using the knowledge acquired from the learned images. However, these methods have a limitation in that it is required to secure and learn in advance a large number of images having a similar style with the image to be processed. Therefore, these methods are suitable for a group of images that can be easily collected, e.g., images containing the same kind of objects captured in various environments, such as scenery pictures, but has a limitation in that it is difficult to apply in a domain for which it is difficult to collect a large number of training images having a similar style with the image to be processed due to the distinct style thereof, e.g., the domain of contemporary abstract artworks or the works of modern impressionists. Recently, SinGAN, which learns a single image and automatically generates various images having the same style as the learned image, has been published. However, because these existing technologies are focused on generation of images having the same style as an input image, images are generated so as to merely have the same style without restrictions on the image content. Accordingly, it is difficult to generate an extended image so as to be harmonious with an original input image using this technology and ordinary knowledge.

Meanwhile, Korean Patent No. 10-2271521, titled "Method for generating surround image and server performing the same", discloses a method for generating surrounding image regions by receiving a main image to be reproduced in the center area of a reproduction space, such as a theater or the like, from an external server, analyzing the received main image, retrieving a source for generating surrounding image regions using the analysis result, and editing the retrieved source.

SUMMARY OF THE INVENTION

An object of the present invention is to preserve the center region of an output image to be the same as an original image and to generate an extended image so as to have the same style as the original image and to be naturally joined to the original image in a horizontal direction.

Another object of the present invention is to improve the automation of a process of producing immersive content that uses walls and a floor and to reduce the production cost and the time taken to produce immersive content in the field of a media art exhibition or a convergence art exhibition in which artwork paintings are used.

A further object of the present invention is to automate a production process for extending the background image of VR content that uses pictures, paintings, and the like in the online content field.

In order to accomplish the above objects, an apparatus for image outpainting based on learning of a single input image according to an embodiment of the present invention includes one or more processors and executable memory for storing at least one program executed by the one or more processors. The at least one program is configured to generate multiple extended images from an input image using multiple noise vectors generated using a noise vector generator, to input a first extended image, among the multiple extended images, the input image, and an image acquired by horizontally flipping the input image and to thereby train a discriminator network such that the loss of a generative adversarial network is minimized, and to learn the multiple extended images such that differences between an image acquired by vertically segmenting the input image and flipping the segments and images respectively corresponding to the center region of a second extended image and the left and right regions of a third extended image, among the multiple extended images, are minimized.

Here, the at least one program may generate the multiple extended images by extending the input image by a preset scale factor of at least 1 in a horizontal direction.

Here, the at least one program may extract a region having the same size as the input image from the second extended image based on the center point thereof and learn the second extended image such that the difference between the extracted region and the input image is minimized.

Here, the at least one program may extract two regions having the same sizes as two regions acquired by vertically segmenting the input image from the left region and the right region of the third extended image and learn the third extended image such that differences between the two regions acquired by segmenting the input image and the left and right regions of the third extended image are minimized.

Here, the at least one program may additionally use the result of learning the second extended image, thereby learning the third extended image such that the difference from the input image is minimized.

Also, in order to accomplish the above objects, a method image outpainting based on learning of a single input image according to an embodiment of the present invention includes generating multiple extended images from an input image using multiple noise vectors generated using a noise vector generator, inputting a first extended image, among the multiple extended images, the input image, and an image acquired by horizontally flipping the input image and thereby training a discriminator network such that the loss of a generative adversarial network is minimized, and learning the multiple extended images such that the sum of two differences is minimized. The first one is the difference between the input image and the center region of a second extended image, and the second one is the difference between images acquired by vertically segmenting the input image and flipping the segments and the left and right regions of a third extended image.

Here, generating the multiple extended images may comprise generating the multiple extended images by extending the input image by a preset scale factor larger than 1 in a horizontal direction.

Here, learning the multiple extended images may comprise extracting a region having the same size as the input image from the second extended image based on the center point thereof and learning the second extended image such that the difference between the extracted region and the input image is minimized.

Here, learning the multiple extended images may comprise extracting two regions having the same sizes as two regions acquired by vertically segmenting the input image from the left region and the right region of the third extended image and learning the third extended image such that differences between the two regions acquired by segmenting the input image and the left and right regions of the third extended image are minimized.

Here, learning the multiple extended images may comprise additionally using the result of learning the second extended image, thereby learning the third extended image such that the difference from the input image is minimized

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
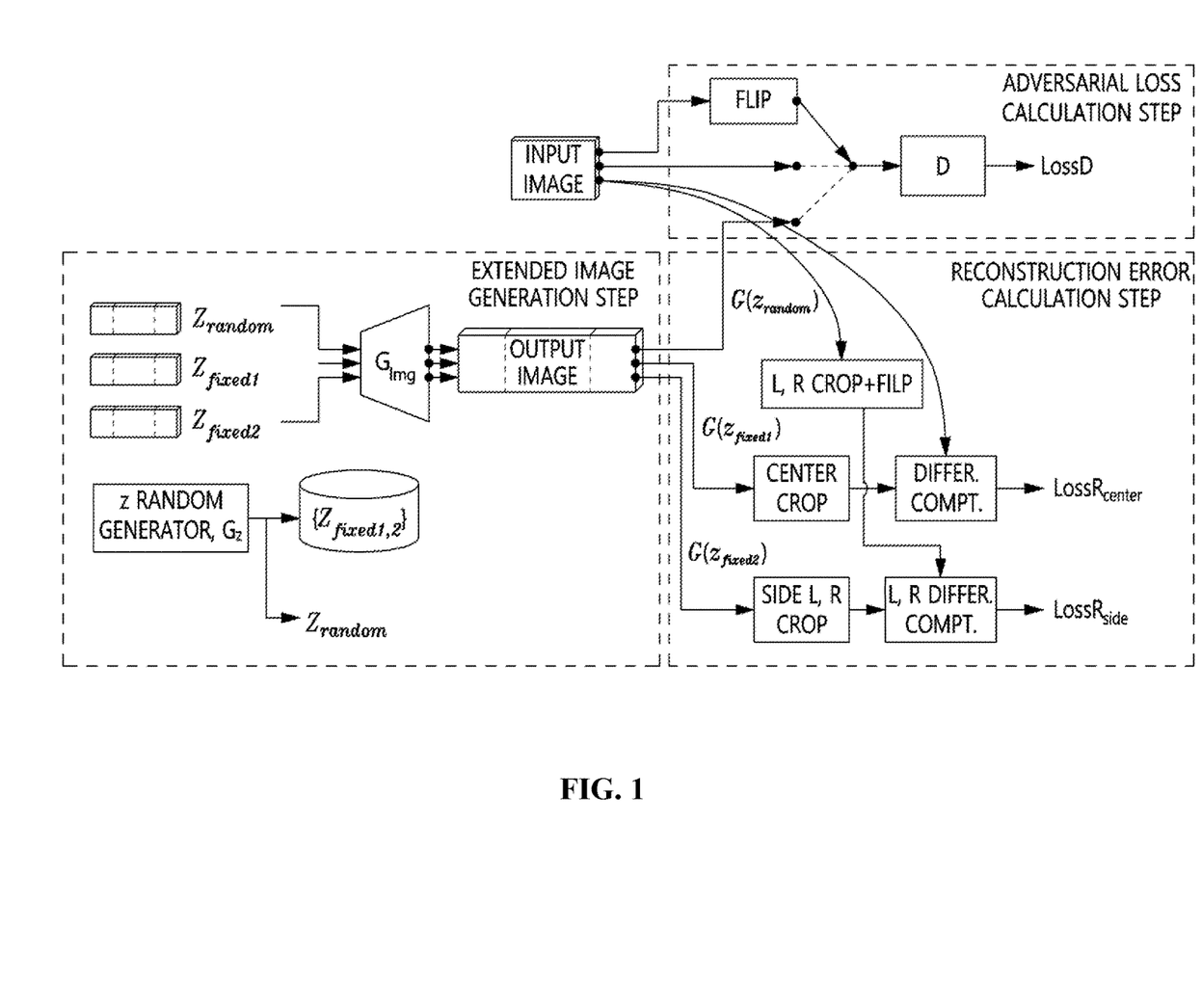
FIG. 1 is a view illustrating a process of learning images for image outpainting according to an embodiment of the present invention.
Figure 2:
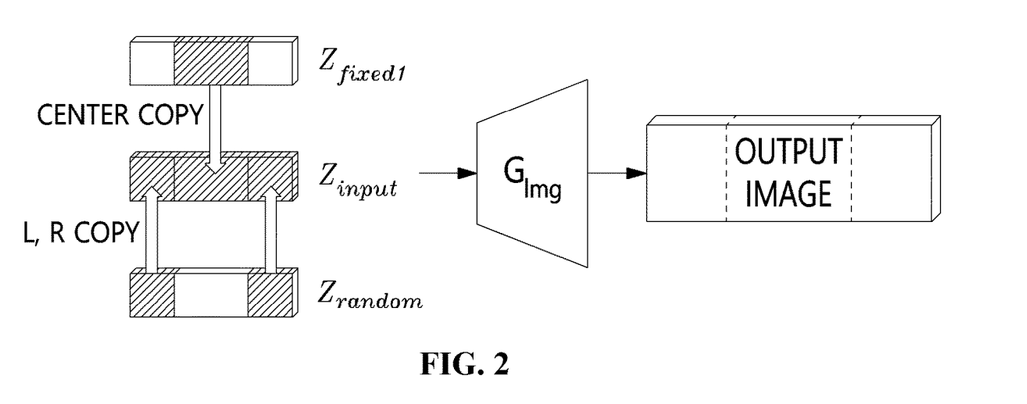
FIG. 2 is a view illustrating a process of inferring an image based on image outpainting according to an embodiment of the present invention.

FIG. 1 is a view illustrating a process of learning images for image outpainting according to an embodiment of the present invention. FIG. 2 is a view illustrating in detail an example of a process of calculating the difference between images extracted from the left and right regions of a generated image and the input image in the step of calculating a reconstruction error illustrated in FIG. 1.

Referring to FIG. 1, an apparatus for image outpainting based on learning of a single input image according to an embodiment of the present invention may learn extended images by performing a step of generating an extended image, a step of calculating an adversarial loss, and a step of calculating a reconstruction error.

In the step of generating an extended image, multiple extended images may be generated from an input image using multiple noise vectors generated using a noise vector generator.

The apparatus for image outpainting based on learning of a single input image according to an embodiment of the present invention may include an image generator $G_{img}$ configured with a multi-scale layer network and a noise vector generator (random generator) $G_z$ for generating noise vectors z to be input to the image generator $G_{img}$.

The noise vector generator $G_z$ generates three types of noise vectors, $z_{random}$, $z_{fixed1}$, and $z_{fixed2}$. Among these vectors, $z_{random}$ may be generated to have a different value each time a learning step is performed. The values of $z_{fixed1}$ and $z_{fixed2}$ may be stored in a noise vector set $\{z_{fixed1, 2}\}$ when they are first generated. In the learning process after that, the stored values of $z_{fixed1}$ and $z_{fixed2}$ may be loaded from the noise vector set and used.

In the step of generating an extended image, the image generator $G_{img}$ may generate multiple extended images (first to third extended images) for the respective inputs, $z_{random}$, $z_{fixed1}$, and $z_{fixed2}$, each time this step is performed.

Here, in the step of generating an extended image, the input image is extended by a preset scale factor larger than 1 in a horizontal direction, whereby multiple extended images may be generated.

Here, the multiple extended images may have a horizontal size that is one to three times the horizontal size of the input image according to a preset scale factor, and an example in which the input image is extended by a scale factor of 2 is described.

In the step of calculating an adversarial loss, the first extended image, among the multiple extended images, the input image, and an image acquired by horizontally flipping the input image are input, and a discriminator network may be trained such that the loss of a generative adversarial network is minimized.

In the step of calculating an adversarial loss, the separate discriminator network D is trained for the first extended image $G(z_{random})$, which is generated by receiving $z_{random}$ as input, among the three images (the first to third extended images) generated in the step of generating an extended image, whereby the loss of the generative adversarial network may be calculated.

The image generator $G_{img}$ is trained to minimize the loss, thereby generating extended images having the same style as the input image.

Here the discriminator network D is trained by alternately inputting a horizontally flipped image as well as the original input image. As a result, training may be performed such that an image, the left and right regions of which have the same style as the horizontal flip of the input image, can be generated.

That is, the horizontally flipped image is additionally input in the step of calculating the adversarial loss, whereby the adversarial loss (lossD) may be calculated.

Also, in the step of calculating a reconstruction error, the multiple extended images are learned such that the sum of two differences is minimized. The first one is the difference between the input image and the center region of a second extended image, $G(z_{fixed1})$, and the second one is the difference between images acquired by vertically segmenting the input image and flipping the segments and the left and right regions of a third extended image, $G(z_{fixed2})$.

Here, in the step of calculating a reconstruction error, the second extended image $G(z_{fixed1})$ is received, and LossR$_{center}$ may be calculated by passing the second extended image $G(z_{fixed1})$ through 'Center Crop' block and 'Differ.Compt.' block (a difference computation block).

'Center Crop' block performs the function of extracting a region having the same size as the input image from the center region of the second extended image, $G(z_{fixed1})$, and 'Differ.Compt.' block may calculate the difference between the extracted image and the input image.

Here, in the step of calculating a reconstruction error, a region having the same size as the input image is extracted from the second extended image based on the center point thereof, and the second extended image $G(z_{fixed1})$ may be learned such that the difference between the extracted region and the input image is minimized.

When the image generator $G_{img}$ is trained such that the calculated difference LossR$_{center}$ is minimized, $G_{img}$ is trained such that the center region of the second extended image is the same as the input image, and the output generated by the image generator $G_{img}$ is stabilized.

Here, in the step of calculating a reconstruction error, two regions having the same sizes as two regions acquired by vertically segmenting the input image may be respectively extracted from the left region and the right region of the third extended image $G(z_{fixed2})$.

Here, the third extended image $G(z_{fixed2})$ may be learned such that the differences between the two regions acquired by segmenting and flipping the input image and the left and right regions of the third extended image $G(z_{fixed2})$ are minimized.

Figure 3:
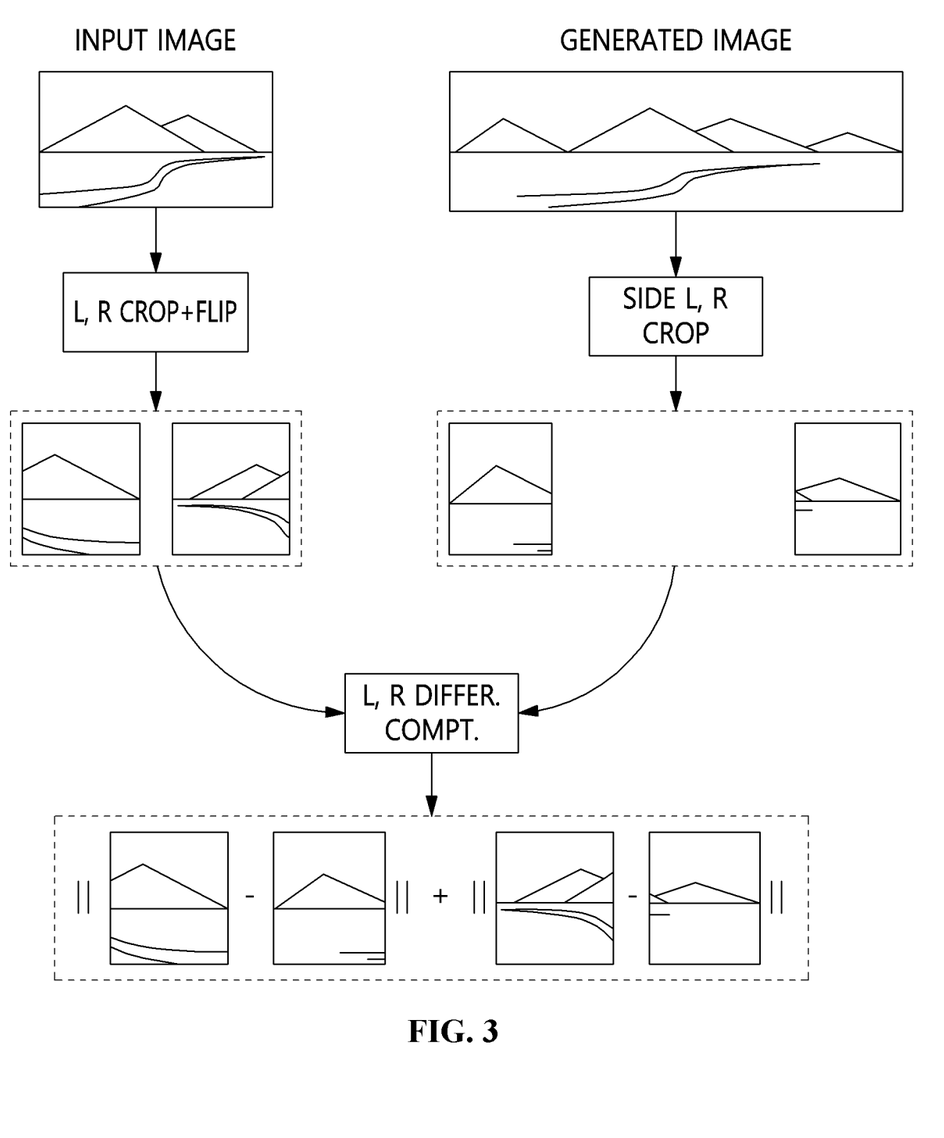
FIG. 3 is a view illustrating in detail an example of a process of calculating the difference between images extracted from the left and right regions of a generated image and the input image in the step of calculating a reconstruction error illustrated in FIG. 1.

Referring to FIG. 3, it can be seen that the process of calculating LossR$_{side}$ by passing the input image through 'L, R Crop+Flip' block and passing the third extended image $G(z_{fixed2})$, through 'Side L, R Crop' block and 'L, R Differ. Compt.' block in the step of calculating a reconstruction error is illustrated.

That is, it can be seen that 'L, R Crop+Flip' block horizontally segments the input image and flips the segments and 'Side L, R Crop' block extracts the left and right regions of the extended image.

When the image generator $G_{img}$ is trained such that LossR$_{side}$ is also minimized using the above calculation, an extended image, the left and right regions of which are naturally joined to the input image in a horizontal direction, may be generated.

FIG. 2 is a view illustrating a process of inferring an image based on image outpainting according to an embodiment of the present invention.

Referring to FIG. 2, in the inference step, images may be generated by extending the left and right side of an input image using the image generator $G_{img}$, and part $\{z_{fixed1}\}$ of the stored noise vector set.

As illustrated in FIG. 2, each time the inference step is performed, $z_{input}$, which is acquired by combining $z_{fixed1}$ and $z_{random}$ by placing $z_{fixed1}$ in the central region and placing $z_{random}$ in the left and right regions, is input to the image generator $G_{img}$.

Accordingly, each time the inference step is performed, an extended image, the left and right regions of which change depending on $z_{random}$, may be generated.

Figure 4:
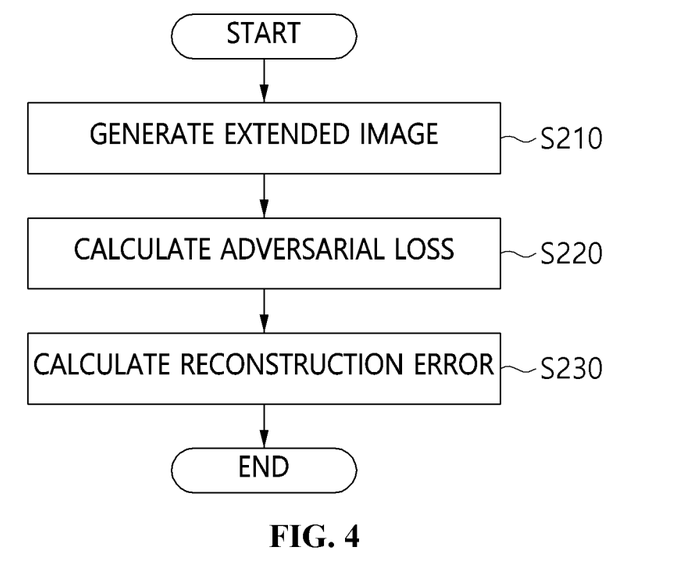
FIG. 4 is a flowchart illustrating a method for learning images for image outpainting according to an embodiment of the present invention.

FIG. 4 is a flowchart illustrating a method for image outpainting based on learning of a single input image according to an embodiment of the present invention.

Referring to FIG. 4, multiple extended images may be generated from an input image using multiple noise vectors generated using a noise vector generator at step 210.

At step 210, an image generator $G_{img}$ configured with a multi-scale layer network may generate extended images.

Here, at step S210, the noise vector generator (random generator) $G_z$ may generate noise vectors z to be input to the image generator $G_{img}$.

Here, at step S210, the noise vector generator $G_z$ may generate three types of noise vectors, $z_{random}$, $z_{fixed1}$, and $z_{fixed2}$.

Here, at step S210, $z_{random}$, among the three types of vectors, may be generated to have a different value each time a learning step is performed.

Here, at step S210, the values of $z_{fixed1}$ and $z_{fixed2}$ may be stored in a noise vector set $\{z_{fixed1, 2}\}$ each time they are first generated in each layer.

In the learning process after that, the stored values of the noise vector set may be loaded and used when an operation is performed in the same layer.

At step S210, the image generator $G_{img}$ may receive $z_{random}$, $z_{fixed1}$, and $z_{fixed2}$ as input and generate multiple extended images (first to third extended images) for $z_{random}$, $z_{fixed1}$, and $z_{fixed2}$ each time this step is performed.

Here, at step S210, the input image is extended by a preset scale factor larger than 1 in a horizontal direction, whereby multiple extended images may be generated.

Here, the multiple extended images may have a horizontal size that is one to three times the horizontal size of the input image according to a preset scale factor, and an example in which the input image is extended by a scale factor of 2 is described.

Also, at step S220, the first extended image, among the multiple extended images, the input image, and an image acquired by horizontally flipping the input image are input, and a discriminator network may be trained such that the loss of a generative adversarial network is minimized.

At step S220, the separate discriminator network D is trained for the first extended image $G(z_{random})$, which is generated by receiving $z_{random}$ as input, among the three images (the first to third extended images) generated in the step of generating an extended image, whereby the loss of the generative adversarial network may be calculated.

At step S220, the image generator $G_{img}$ is trained to minimize the loss and generate extended images having the same style as the input image.

Here, at step S220, the discriminator network D is trained by alternately inputting a horizontally flipped image as well as the original input image.

Here, at step S220, training may be performed such that an image, the left and right regions of which have the same style as the horizontal flip of the input image, can be generated.

That is, at step S220, the horizontally flipped image is additionally input, whereby the adversarial loss, lossD, may be calculated.

Also, at step S230, the multiple extended images are learned such that the sum of two differences is minimized. The first one is the difference between the input image and the center region of a second extended image, $G(z_{fixed1})$, and the second one is the difference between images acquired by vertically segmenting the input image and flipping the segments and the left and right regions of a third extended image, $G(z_{fixed2})$.

Here, at step S230, the second extended image $G(z_{fixed1})$ is received, and $LossR_{center}$ may be calculated by passing the second extended image $G(z_{fixed1})$ through 'Center Crop' block and 'Differ.Compt.' block (a difference computation block).

'Center Crop' block performs the function of extracting a region having the same size as the input image from the center region of the generated extended image, and 'Differ-.Compt.' block may calculate the difference between the extracted image and the input image.

Here, at step S230, a region having the same size as the input image is extracted from the second extended image based on the center point thereof, and the second extended image $G(z_{fixed1})$ may be learned such that the difference from the input image is minimized.

At step S230, when the image generator $G_{img}$ is trained such that the calculated difference $LossR_{center}$ is minimized, the output generated by the image generator $G_{img}$ may be stabilized.

Here, at step S230, training may be performed such that the center region of the generated image is same as the input image when $z_{fixed1}$ is input.

Here, at step S230, two regions having the same sizes as two regions acquired by vertically segmenting the input image may be respectively extracted from the left region and the right region of the third extended image $G(z_{fixed2})$.

Here, at step S230, the third extended image $G(z_{fixed2})$ may be learned such that the differences between the two regions acquired by segmenting and flipping the input image and the left and right regions of the third extended image $G(z_{fixed2})$ are minimized.

Figure 5:
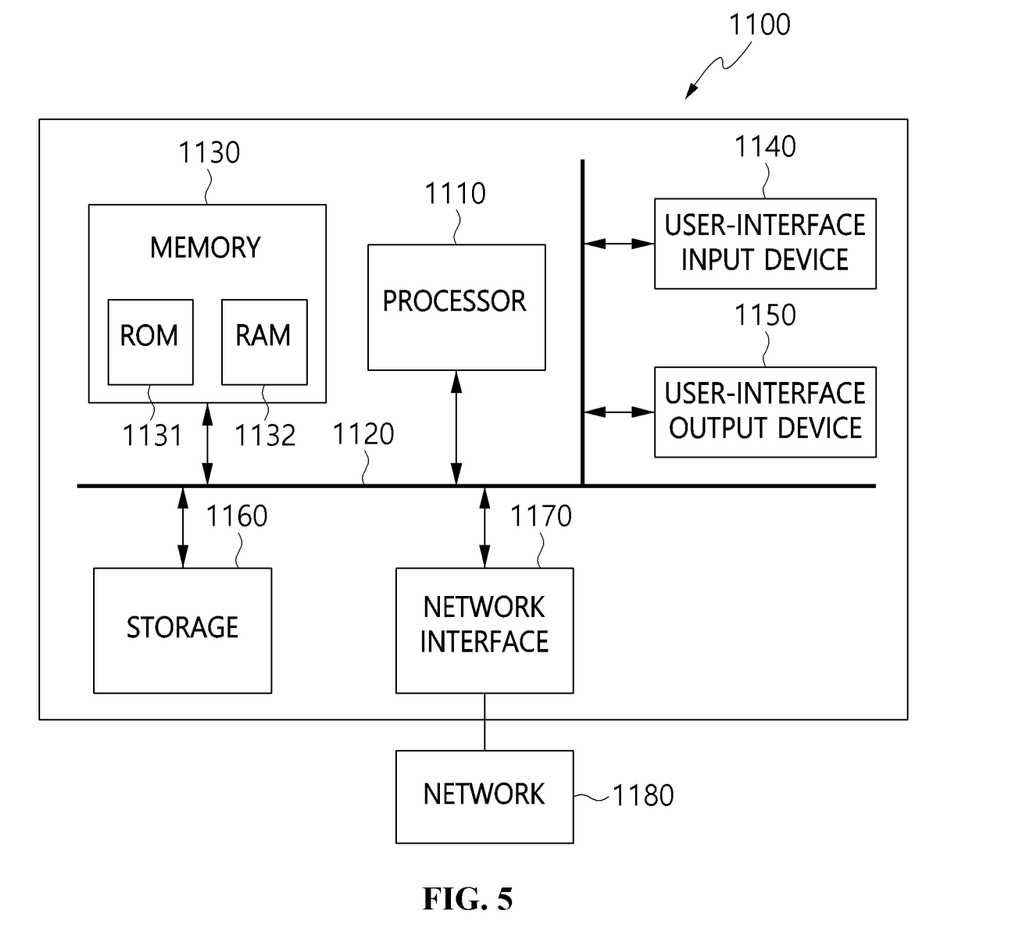
FIG. 5 is a view illustrating a computer system according to an embodiment of the present invention.

FIG. 5 is a view illustrating a computer system according to an embodiment of the present invention.

Referring to FIG. 5, the apparatus for image outpainting based on learning of a single input image according to an embodiment of the present invention may be implemented in a computer system 1100 including a computer-readable recording medium. As illustrated in FIG. 5, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for image outpainting based on learning of a single input image according to an embodiment of the present invention includes one or more processors 1110 and executable memory 1130 for storing at least one program executed by the one or more processors 1110. The at least one program generates multiple extended images from an input image using multiple noise vectors generated using a noise vector generator, inputs a first extended image, among the multiple extended images, the input image, and an image acquired by horizontally flipping the input image and thereby trains a discriminator network such that the loss of a generative adversarial network is minimized, and learns the multiple extended images such that the sum of two differences is minimized. The first one is the difference between the input image and the center region of a second extended image, and the second one is the difference between images acquired by vertically segmenting the input image and flipping the segments and the left and right regions of a third extended image.

Here, the at least one program may generate the multiple extended images by extending the input image by a preset scale factor larger than 1 in a horizontal direction.

Here, the at least one program may extract a region having the same size as the input image from the second extended image based on the center point thereof, and may learn the second extended image such that the difference from the input image is minimized.

Here, the at least one program may extract two regions having the same sizes as two regions acquired by vertically segmenting the input image from the left region and the right region of the third extended image, and may learn the third extended image such that the differences between the two regions acquired by segmenting and flipping the input image and the left and right regions of the third extended image are minimized.

The present invention may preserve the center region of an output image to be the same as an original image and generate an extended image so as to have the same style as the original image and to be naturally joined to the original image in a horizontal direction.

Also, the present invention may improve the automation of a process of producing immersive content that uses walls and a floor, and may reduce the production cost and the time taken to produce immersive content in the field of a media art exhibition or a convergence art exhibition in which artwork paintings are used.

Also, the present invention may automate a production process for extending the background image of VR content that uses pictures, paintings, and the like in the online content field.

As described above, the apparatus and method for image outpainting based on learning of a single input image according to the present invention are not limitedly applied to the configurations and operations of the above-described embodiments, but all or some of the embodiments may be selectively combined and configured, so the embodiments may be modified in various ways.

What is claimed is:

1. An apparatus for image outpainting based on learning of a single input image, comprising:
   one or more processors; and
   executable memory for storing at least one program executed by the one or more processors,
   wherein the at least one program is configured to
   generate multiple extended images from an input image using multiple noise vectors generated using a noise vector generator,
   input a first extended image, among the multiple extended images, the input image, and an image acquired by horizontally flipping the input image and thereby train a discriminator network such that a loss of a generative adversarial network is minimized, and
   learn the multiple extended images such that a sum of two differences is minimized, a first one of the two differences being a difference between the input image and a center region of a second extended image, and a second one of the two differences being a difference between images acquired by vertically segmenting the input image and flipping segments of the input image and left and right regions of a third extended image.

2. The apparatus of claim 1, wherein the at least one program generates the multiple extended images by extending the input image by a preset scale factor larger than 1 in a horizontal direction.

3. The apparatus of claim 2, wherein the at least one program extracts a region having a same size as the input image from the second extended image based on a center point thereof and learns the second extended image such that a difference from the input image is minimized.

4. The apparatus of claim 3, wherein the at least one program extracts two regions having same sizes as two regions acquired by vertically segmenting the input image from a left region and a right region of the third extended image and learns the third extended image such that differences between the two regions acquired by segmenting and flipping the input image and the left and right regions of the third extended image are minimized.

5. A method for image outpainting based on learning of a single input image, performed by an apparatus for image outpainting based on learning of a single input image, comprising:

generating multiple extended images from an input image using multiple noise vectors generated using a noise vector generator, inputting a first extended image, among the multiple extended images, the input image, and an image acquired by horizontally flipping the input image and thereby training a discriminator network such that a loss of a generative adversarial network is minimized, and learning the multiple extended images such that a sum of two differences is minimized, a first one of the two differences being a difference between the input image and a center region of a second extended image, and a second one of the two differences being a difference between images acquired by vertically segmenting the input image and flipping segments of the input image and left and right regions of a third extended image.

6. The method of claim 5, wherein generating the multiple extended images comprises generating the multiple extended images by extending the input image by a preset scale factor larger than 1 in a horizontal direction.

7. The method of claim 6, wherein learning the multiple extended images comprises extracting a region having a same size as the input image from the second extended image based on a center point thereof and learning the second extended image such that a difference from the input image is minimized.

8. The method of claim 7, wherein learning the multiple extended images comprises extracting two regions having same sizes as two regions acquired by vertically segmenting the input image from a left region and a right region of the third extended image and learning the third extended image such that differences between the two regions acquired by segmenting and flipping the input image and the left and right regions of the third extended image are minimized.

* * * * *